United States Patent [19]

Brooker et al.

[11] 4,405,690

[45] Sep. 20, 1983

[54] POLYETHYLENE GLYCOL MODIFIED MELAMINE ALDEHYDE RESIN AND POSTFORMABLE LAMINATE MADE THEREWITH

[75] Inventors: Lenon G. Brooker, Hampton; Halbert Mungin, Varnville, both of S.C.

[73] Assignee: Westinghouse Electric Corp., Pittsburgh, Pa.

[21] Appl. No.: 208,591

[22] Filed: Nov. 19, 1980

[51] Int. Cl.³ .............................................. B32B 27/08
[52] U.S. Cl. ................... 428/503; 428/172; 524/843
[58] Field of Search ................. 428/172, 503; 524/843

[56] References Cited

U.S. PATENT DOCUMENTS

| | | | |
|---|---|---|---|
| 2,817,614 | 12/1957 | Fraser | 428/530 |
| 4,046,937 | 7/1977 | McCaskey, Jr. et al. | 428/530 |
| 4,093,579 | 6/1978 | De Lapp et al. | 428/503 |
| 4,294,738 | 10/1981 | Bersniewicz | 428/503 |
| 4,311,757 | 1/1982 | Raghara et al. | 428/323 |

FOREIGN PATENT DOCUMENTS 546143 12/1972 Sweden.

*Primary Examiner*—William R. Dixon, Jr.
*Attorney, Agent, or Firm*—D. P. Cillo

[57] ABSTRACT

A modified melamine resin, useful for impregnating surface sheets for postformable laminates, comprises: (A) melamine and aldehyde, where the mole ratio of melamine to aldehyde is from about 1 to 1.5 to about 1 to 3, (B) about 1 to 45 weight percent, based on weight of melamine, of water soluble polyethylene glycol having a molecular weight of from about 200 to about 1,000, and (C) water; where the polyethylene glycol, melamine and aldehyde are reacted together in the presence of heat and water.

5 Claims, No Drawings

POLYETHYLENE GLYCOL MODIFIED MELAMINE ALDEHYDE RESIN AND POSTFORMABLE LAMINATE MADE THEREWITH

BACKGROUND OF THE INVENTION

Melamine formaldehyde resins are extensively used for impregnating print and overlay sheets in the manufacture of decorative laminated plastics because of their transparency, toughness, light stability, and relatively low cost. Despite the widespread use of melamine formaldehyde resins as surface material, in decorative high-pressure laminates, these resins have one major deficiency in that they are quite brittle in an unmodified state. This brittleness limits their use in the preparation of decorative high-pressure postforming-type laminates. A postformable laminate is a fully cured laminate which can nevertheless be heated and bent into a new shape.

Fraser, in U.S. Pat. No. 2,817,614, noting the problems associated with flow promoting agents, such as polyesters and polyethylene glycol, in non-aqueous melamine compositions where they were not chemically combined with the melamine component, and the problems associated with aromatic amines and aromatic sulfonamides which are reacted with melamine and an aldehyde in an aqueous system; used an aralkyl quanamine as a modifying agent to improve postformability of laminates having melamine aldehyde impregnated surface layers. In Fraser, standard postforming to a ⅜ inch bend required temperatures of from 180° C. to 200° C.

Subsequently, McCaskey and Brooker, in U.S. Pat. No. 4,046,937, used water-soluble, aliphatic diglycidyl ethers as modifying agents to improve low temperature postformability of laminates having melamine aldehyde impregnated surface layers. Use of these modifiers allowed ¼ inch postformability at about 121° C. to 125° C. There is a need, however, for even more improved postformable laminates and postforming resins providing an improved degree of toughness, clarity, water resistance, light stability, and postformability to laminate surface layers.

SUMMARY OF THE INVENTION

We have discovered that the use of polyethylene glycol, having a molecular weight of from about 200 to about 1,000, can provide outstanding postformability, as well as provide improved clarity, water resistance and light stability, to laminates having melamine aldehyde impregnated print and overlay surface sheets. These laminates, having postformable cores, will postform to a ¼ inch bend at between about 118° C. and 120° C.

DESCRIPTION OF THE PREFERRED EMBODIMENTS

The modified melamine resin is made by admixing an aldehyde, water, melamine, and polyethylene glycol, and reacting these ingredients in the presence of heat. The polyethylene glycol can be added before reflux of the melamine aldehyde, or after reflux while the temperature of the mixture is in the range of about 80° C. to 90° C. In either case, there is polyethylene glycol combination, interaction, and reaction with the aqueous melamine aldehyde. Subsequently, effective amounts of solvent, preferably methyl alcohol, and pH adjusting agent, preferably quanamine carbonate are added. Optionally, an effective amount of internal plasticizer, preferably toluene sulfonamide may be added.

The mole ratio of melamine:aldehyde should be at least about 1:1.5 (i.e., moles of aldehyde divided by moles of melamine should equal at least about 1.5), since less aldehyde may render the melamine aldehyde water-insoluble. The mole ratio of melamine:aldehyde should not exceed about 1:3, since more aldehyde will decrease the postformability of the resin. The preferred mole ratio melamine:aldehyde is from about 1:1.5 to about 1:2, as this range usually produces laminates with the best postforming characteristics.

Suitable aldehydes include acetaldehyde, propionaldehyde, benzaldehyde, glyoxal, and methylglyoxal. Mixtures of aldehydes may also be used. The preferred aldehyde is formaldehyde as it is readily available and inexpensive. The aldehyde is usually added as an aqueous solution.

The polyethylene glycol, which must be water soluble, is added to the aqueous melamine aldehyde in the amount of about 1 wt.% to about 45 wt.%, preferably between 5 wt.% and 15 wt.%, based on melamine weight. Its inclusion as a modifying agent provides postformability properties to absorbent sheet articles impregnated with such modified melamine resins. Under 1 wt.% polyethylene glycol, little postforming will occur. Over 45 wt.%, the clarity, water resistance, toughness and light stability of the melamine aldehyde resin will suffer. The polyethylene glycol must have a molecular weight range of from about 200 to about 1,000, preferably from 200 to 600.

This polyethylene glycol is compatible with melamine in aqueous solution and will combine, interact and react with the aqueous melamine aldehyde at temperatures of between about 85° C. to 97° C. This polyethylene glycol can be added before or after reflux of the melamine aldehyde. The polyethylene glycol inclusion also reduces the chance of the melamine impregnated surface sheets of the laminate sticking to the press plates during molding, and may allow elimination of mold release agents either on the press plates or in the surface sheet impregnating resin.

The amount of water used should be sufficient to produce a solution of at least about 15% solids (including the polyethylene glycol) since weaker solutions do not deposit enough solids on the paper and are costly to dry. The solution should be less than about 65% solids as a thicker solution does not saturate the paper well although a vacuum could be used to impregnate it into the paper. A good working range is about 40% to about 60% solids.

The composition may optionally include up to about 1 pph. (parts per hundred parts resin, where "resin" refers to the weight of melamine plus aldehyde plus polyethylene glycol) of an internal mold release agent. Suitable internal mold releases include various fatty alcohol phosphates, fatty acid polyglycols, and alkyl ammonium phosphate ester. The preferred internal mold releases are fatty alcohol phosphates because they have the least effect on surface appearance. Latent catalysts, such as aluminum chloride, magnesium bromide and the like can be added in minor amounts, about 0.1 wt.% to about 2 wt.% based on solids, to enhance the cure of the resin, especially where substantial amounts of polyethylene glycol are used.

Well known internal plasticizers, up to about 20 wt.%, based on weight of melamine, may optionally be included in the composition. Suitable plasticizers are well known in the art and described, for example in U.S. Pat. No. 2,817,614, and include aromatic amines, aromatic amides, aralkyl quanamine, and preferably o-p-toluene sulfonamide. The plasticizer is preferably added after the reaction but before any cure or gel, as it is not needed prior to then. Near the end of the process, it is preferable to add a solvent to the resin to add to its storage life. Generally up to 25 wt.%, preferably between 5 wt.% and 20 wt.% solvent, based on weight of melamine, can be added. Suitable solvents include ethanol, isopropanol, and butanol. Methanol (methyl alcohol) is preferred as it is inexpensive.

In the method of this invention, the composition is first reacted to the A-stage. This reaction should be conducted at a pH of at least about 7.8, as at a lower pH the reaction may be too rapid to control. However, a pH in excess of about 9 generally requires too much time. A good operating pH is about 8.3 to about 8.5. The reaction may be conducted for about 5 to 15 minutes at reflux temperature which is usually about 97° C. The reaction is then cooled to about 90° C. and held until a hydrophobe is reached in 25° C. water, i.e., until the point at which one drop of resin imparts a permanent cloudiness when added to approximately 500 ml. of water at 25° C. The A-stage is reached when the water dilutability of the resin has decreased to about 100% to 300% by volume (experimentally determined).

If the polyethylene glycol was not added and reacted with the aqueous melamine and aldehyde before reflux, it is added now, and the mixture is held at between about 85° C. and 90° C. for a time effective to allow combination, interaction and reaction of the polyethylene glycol with the aqueous melamine aldehyde. The mold release, plasticizer and solvent previously described, if used, are then added at between about 85° C. and 90° C. Finally, after cooling, the pH is adjusted, to about 9.2 to 9.5, preferably with quanamine carbonate, to increase the storage life of the resin.

The plastic, postformable resinous composition is then applied to a suitable absorbent sheet of paper or cloth. Paper is preferred as it is less expensive than cloth. Rayon paper, Orlon paper, cotton linters paper, or other paper can be used, but alpha-cellulose paper is preferred for both the decorative print sheet and the overlay sheet.

The resin is generally applied to the paper or cloth by passing the paper or cloth through a trough of the resin then through metering rolls which remove excess resin. A weight ratio of resin solids to substrate of between about 1.2 and about 4.0 should be used for the decorative sheet, and a weight ratio of about 1.4 to about 1.8 is preferred. For the overlay sheet, a weight ratio of resin solids to substate of between about 2.0 and about 4.0, should be used and a ratio of about 2.4 to about 3.0 is preferred. If a solid-color print sheet is used, the overlay sheet can be eliminated. In that event the solids-to-substrate ratio is about 1.2 to about 4.0, and 1.8 to about 2.5 is preferred. For better postformability the polyethylene glycol should be present in the resin which coats both the overlay and the print sheet. The coated substrate is passed through an oven at about 65° C. to about 165° C. for about 30 seconds to about 2½ minutes in order to evaporate the solvent and B-stage the resin, i.e., make it dry to the touch but not completely cured.

Laminates are formed by stacking sheets of substrates coated with B-staged postformable resin, as is known in the art. A typical laminate consists of core stock covered with one print sheet and one overlay sheet on top. Cure stock typically consists of about 1 to about 15 sheets of an absorbent sheet impregnated with a B-staged phenol-aldehyde resin, usually phenolformaldehyde. The core stock is usually Kraft paper, but cloth and other papers can also be used.

The laminates are assembled and groups of laminates separated by metal spacers are pressed at about 1,000 psi. to about 1,500 psi. at about 120° C. to about 150° C. for about 30 minutes. After cooling for about 30 minutes the press is opened and the completely cured C-staged laminates are removed.

The C-staged laminates can be postformed by heating at about 118° C. to about 205° C., bending, and cooling. At less than about 118° C., the laminate may crack during postforming, and at more than about 205° C., the laminate is very likely to blister, char, and discolor. The best temperature range for postforming is believed to be about 121° C. to about 177° C. The C-staged laminates generally range in size from about 8 inches to 12 feet long and about 0.015 inch to ⅛ inch thick. They can be bonded, usually with an adhesive, to a substrate such as thin board, plywood, steel, particle board, or other material to form a counter top, desk top, interior of a subway car, cabinet door, or other article.

The following examples further illustrate this invention. All of the laminates prepared in these examples according to this invention were postformed to a radius of ¼ inch at 120° C., using the test apparatus and procedure of NEMA test LD3-3.14, from Standard NEMA Publications Book LD3-1975. All laminates prepared according to this invention in the following examples met or exceeded all NEMA standards (Book LD3-1975) for postformable grade decorative laminates including: resistance to scuff LD3-3.02; resistance to impact LD3-3.03; resistance to dimensional change LD3-3.04; resistance of surface to boiling water LD3-3.05; resistance of surface to high temperature LD3-3.06; resistance to radiant heat LD3-3.07; resistance to conductive heat LD3-3.08; stain resistance LD3-3.09; UV light resistance LD3-3.10; appearance LD3-3.11; cleanability LD3-3.12; surface finish LD3-3.13; formability LD3-3.14; and blister resistance LD3-3.15.

EXAMPLE 1

A reaction flask was charged with 272 grams of 37% aqueous formaldehyde (3.35 moles formaldehyde) and 183 grams of water. The formaldehyde-water solution was adjusted to a pH of 8.5 with 10% aqueous sodium hydroxide. Then, 260 grams of melamine crystals (2.06 moles) and 52 grams of polyethylene glycol having a molecular weight of 400 were added. The mixture of polyethylene glycol aqueous melamine aldehyde was then refluxed for 10 minutes at about 95° C. to 97° C., to chemically combine and react the ingredients. The reaction mixture was cooled to 90° C. and held at that temperature until a hydrophobe was reached in 15° C. water. At this point 39 grams of ortho-para-toluene-sulfonamide was added to the reaction mixture and the reaction was held at 85° C. to 90° C. for five minutes.

Then, 50 grams of methyl alcohol was added to the reaction mixture which was then cooled to 25° C., at which time quanidine carbonate was added to adjust the pH to about 9.3. This provided a postforming resin composition having a mole ratio of melamine:aldehyde of 2.06:3.35 = 1:1.6 and sufficient water to provide a 56% solids solution.

Decorative solid color print sheets and clear overlay sheets were impregnated with the resin prepared above, and subsequently 0.050 inch thick postforming laminates were molded for evaluation using standard procedures described hereinbefore. As a control, similar sheets were impregnated with a conventional standard postforming resin currently used to produce competitive postforming laminates.

Laminates molded for comparison were of four different surface constructions; (1) solid color sheets impregnated with resin described above, (2) overlay sheets impregnated with resin described above plus print sheets impregnated with a conventional postforming resin, (3) solid color sheets impregnated with a conventional postforming resin, and (4) overlay and print sheets impregnated with a conventional postforming resin. A conventional postforming core of five phenol-formaldehyde sheets was used in the construction of all laminates.

The resulting polyethylene glycol modified laminates (1) and (2) exhibited superior postforming characteristics over conventional laminates (3) and (4). None of the glycol modified melamine impregnated laminates were affected by hot water or hot wax; they were also light stable, had a good degree of clarity, postformed to ¼ inch radius at 120° C., and passed all the NEMA tests described above.

EXAMPLE 2

A reaction kettle was charged with 37.6 pounds of 37% aqueous formaldehyde (210.5 moles formaldehyde) and 13.6 pounds of water. The formaldehyde-water solution was adjusted to a pH of 8.5 with 10% aqueous sodium hydroxide. Then, 36 pounds of melamine crystals (129.7) was added. The mixture of aqueous melamine aldehyde was then refluxed for 10 minutes at about 95° C. to 97° C., to chemically combine and react the ingredients. The reaction mixture was cooled to 90° C. and held at that temperature until a hydrophobe was reached in 15° C. water. At this point 17.2 pounds of polyethylene glycol having a molecular weight of 400, and 3.6 pounds of ortho-para-toluenesulfonamide was added to the reaction mixture. The admixture was then held at 90° C. for an additional five minutes to allow combination and reaction of all the ingredients.

Then, 3.6 pounds of methyl alcohol was added to the reaction mixture which was then cooled to 25° C., at which time quanidine carbonate was added to adjust the pH to about 9.3. This provided a postforming resin composition having a mole ratio of melamine:aldehyde of 129.7:210.5=1:1.62 and sufficient water to provide a 56% solids solution.

Decorative solid color print sheets and clear overlay sheets were impregnated with the resin prepared above, the subsequently 0.042 inch thick postforming laminates were molded for evaluation using standard procedures described hereinbefore. As a control, similar sheets were impregnated with a conventional standard postforming resin currently used to produce competitive postforming laminates.

Laminates molded for comparison were of four different surface constructions; (1) solid color sheets impregnated with resin described above, (2) overlay sheets impregnated with resin described above plus print sheets impregnated with a conventional postforming resin, (3) solid color sheets impregnated with a conventional postforming resin, and (4) overlay and print sheets impregnated with a conventional postforming resin. A conventional postforming core of five phenol-formaldehyde sheets was used in the construction of all laminates.

The phenol-formaldehyde resulting polyethylene glycol modified laminates (1) and (2) exhibited superior postforming characteristics over conventional laminates (3) and (4). None of the glycol modified melamine impregnated laminates were affected by hot water or hot wax; they were also light stable, had a good degree of clarity, postformed to ¼ inch radius at 120° C., and passed all the NEMA tests described above.

Other melamine:aldehyde mole ratios and molecular weights of polyethylene glycol, as described above, and other enumerated aldehydes, will produce similarly outstanding postforming resinous compositions.

We claim:

1. A high pressure, postformed laminate, comprising postformable core stock comprising a plurality of absorbent sheets impregnated with a postformable phenol-aldehyde resin to which is bonded, at a pressure of at least about 1,000 psi., an absorbent print sheet impregnated with a resinous composition consisting essentially of the cured admixture of:
   (A) melamine and aldehyde, where the mole ratio melamine:mole ratio aldehyde is from about 1:1.5 to about 1:3;
   (B) about 1 weight percent to about 45 weight percent, based on weight of melamine, of water soluble polyethylene glycol having a molecular weight of from about 200 to about 1,000; and
   (C) sufficient water to form a solution of about 15 percent solids to about 65 percent solids; where the polyethylene glycol, melamine, and aldehyde are reacted together in the presence of heat and water, and where the bonded high pressure laminate has a portion thereof postformed to a predetermined radius at temperatures of about 118° C. or higher.

2. The postformed laminate of claim 1, where the polyethylene glycol has a molecular weight of from about 200 to 600, the mole ratio of melamine:mole ratio aldehyde is from about 1:1.5 to about 1:2, and the laminate thickness is between about 0.015 inch to about ⅛ inch.

3. The postformed laminate of claim 1, where the weight ratio of impregnated resin solids to print sheet is between about 1.2 and about 4.0, the bonding pressure is from about 1,000 psi to about 1,500 psi, and the laminate is postformed to a radius of ¼ inch or higher.

4. The postformed laminate of claim 1, where an absorbent overlay sheet impregnated to a weight ratio of impregnated resin solids to overlay sheet of between about 2.0 and about 4.0 is bonded to the top of the print sheet.

5. The postformed laminate of claim 1, where the aldehyde in the cured admixture is formaldehyde, said cured admixture also including up to about 1 pph. of a mold release agent and up to about 20 percent by weight, based on weight of melamine, of a plasticizer selected from the group consisting of aromatic amines, aromatic amides, aralkyl guanamines, and toluene sulfonamides, and the laminate is postformed to a radius of ¼ inch or higher at a temperature of from about 118° C. to about 177° C.

* * * * *